United States Patent [19]

Anctil et al.

[11] Patent Number: 4,538,881
[45] Date of Patent: Sep. 3, 1985

[54] OPTICAL FIBER CABLE INCLUDING A STRAIN EQUALIZING ADHESIVE WHICH CONSTRAINS OPTICAL LOSS

[75] Inventors: Stephen N. Anctil, Rochester, N.H.; Robert F. Gleason, Freehold, N.J.; Don A. Hadfield, North Hampton; John S. B. Logan, Jr., Dover, both of N.H.; Alfred G. Richardson, Aberdeen, N.J.

[73] Assignee: AT&T Bell Laboratories, Murray Hill, N.J.

[21] Appl. No.: 469,430

[22] Filed: Feb. 24, 1983

[51] Int. Cl.³ .............................................. G02B 5/14
[52] U.S. Cl. ........................... 350/96.23; 350/96.10; 156/433; 156/436; 156/441; 174/68 R; 174/70 R; 174/110 R; 174/110 SR
[58] Field of Search ............... 350/96.23, 96.10, 96.23; 156/56, 172, 179, 180, 433, 436, 441, 434; 174/68 R, 70 R, 106 R, 110 R, 110 SR

[56] References Cited

U.S. PATENT DOCUMENTS

| 4,156,104 | 5/1979 | Mondello | 174/70 |
| 4,158,478 | 6/1979 | D'Auria et al. | 350/96.23 |
| 4,197,380 | 4/1980 | Chao et al. | 525/199 |
| 4,374,608 | 2/1983 | Anderson | 350/96.23 |
| 4,390,238 | 6/1983 | Van Der Hoek | 350/96.23 |
| 4,396,446 | 8/1983 | Franken | 350/96.23 |
| 4,461,540 | 7/1984 | Franken | 350/96.23 |
| 4,484,963 | 11/1984 | Anctil et al. | 156/172 |

FOREIGN PATENT DOCUMENTS 2063503  6/1981  United Kingdom ............ 350/96.23

OTHER PUBLICATIONS

Yabuta et al., "Submarine Optical Fibre . . . Tension", *Electronics Lett.*, 10/82, vol. 18, No. 22, pp. 943-945.
Brown et al., "Thermoplastic Elastomers", *Rubber Age*, 3/72, pp. 35-42.
Hoeschele, "Segmented Polyether . . . Elastomers", *Polymer Eng. and Sci.*, Dec. 1974, vol. 14, No. 12, pp. 848-852.
Brown, "Thermoplastic Polyester . . . Applications", *Pro. of 24th Int. Wire and Cable Sym.*, 11/75, pp. 292-299.
MacChesney et al., "A New Technique . . . Fibers", *Proceedings of the I.E.E.E.*, 9/74, pp. 1280-1281.
DiMarcello et al., "Strength Characteristics . . . Fibers", 3rd *Annual Conf. on Int. Optics and Optical Fibers*, 4/81, p. 26.
Lazay et al., "An Improved Single . . . Simultaneously", C.L.E.O., 6/81, pp. W6-6-1.
Lazay et al., "Developments . . . Bell Laboratories", *IEEE J. of Quant. Elect.*, vol. QE-18, No. 4, 4/82, pp. 504-510.
Bell Laboratories, "SL Deep Water Sea Trial", *Bell Labs Press Release*, 9/82, pp. 1-2.

*Primary Examiner*—William L. Sikes
*Assistant Examiner*—Brian M. Healy
*Attorney, Agent, or Firm*—Richard B. Havill

[57] ABSTRACT

There is disclosed an undersea communications cable containing optical fibers. The cable is fabricated so that fiber optical loss characteristics vary only slightly with changes in tensile strain in the cable.

5 Claims, 3 Drawing Figures

OPTICAL FIBER CABLE INCLUDING A STRAIN EQUALIZING ADHESIVE WHICH CONSTRAINS OPTICAL LOSS

BACKGROUND OF THE INVENTION

The invention relates to an undersea communications cable which may be described more particularly as a cable containing optical fibers.

Coaxial undersea communications cables have been manufactured and deployed in analog telecommunications systems. In designing those cables, it has been necessary to overcome some obvious environmental factors such as low temperature, high compressive pressure and corrosive water. Additionally it has been necessary to design undersea cables to withstand large tensile and bending stresses encountered during cable laying and recovery operations.

Recent advances in the field of optical fiber communications technology have made possible some practical optical fiber communications systems. The characteristics of these systems, such as digital format, wide bandwidth and long repeater spacings, lead to what appears to be a relatively low cost per channel mile. This potential low cost makes an undersea communications cable containing optical fibers an attractive alternative to present day analog coaxial communications cables.

Heretofore, an undersea communications cable containing optical fibers was described in U.S. Pat. No. 4,156,104, issued to R. C. Mondello. Such cable included a central filament and stranded steel wires separated from the central filament by a core in which the fibers are embedded.

A problem arises in the design and fabrication of a cable including optical fibers for use in an undersea communication system. The measured loss of the optical fibers included in the cable has been dependent upon strain in the cable. Any large fluctuations in loss caused by strain in the cable during manufacture, deployment, or operation of the cable system complicate the processes of starting up, lining up and operating the undersea communication system.

SUMMARY OF THE INVENTION

This problem is solved by a communications cable including optical fibers having an optical loss characteristic which varies only slightly with changes of tensile strain in the cable.

BRIEF DESCRIPTION OF THE DRAWINGS

A better understanding of the invention may be derived from the following detailed description when that description is read in view of the appended drawings wherein.

DETAILED DESCRIPTION

Figure 1:
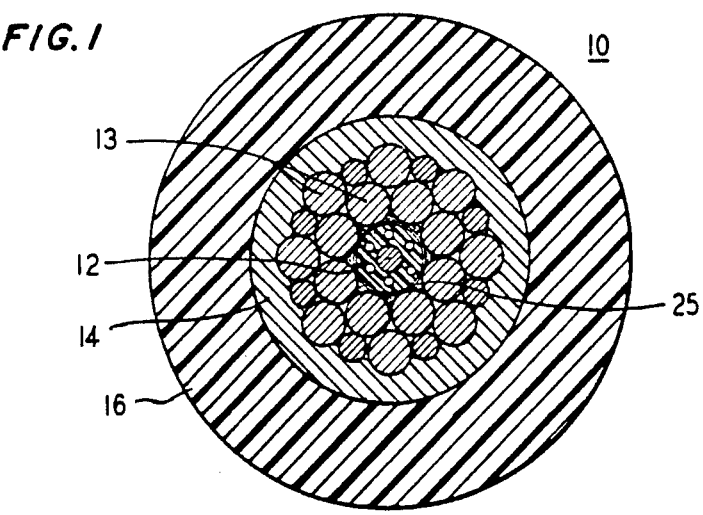
FIG. 1 is a cross-sectional view of an embodiment of a communications cable including optical fibers.

Referring now to FIG. 1, there is shown a cross section 10 of an undersea communications cable containing optical fibers arranged for transmission of optical signals. The cable includes a core 12, two layers of steel strand 13, a cylindrical conductor 14, and an insulator and protective jacket 16.

Figure 2:
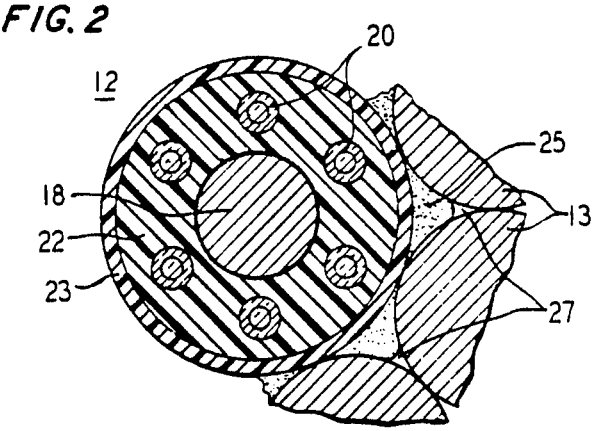
FIG. 2 is an enlarged cross-sectional view of a core and parts of some strength members of the cable of FIG. 1.

As shown in FIG. 2, the core 12 of the cable includes a central elongated strength member, or kingwire, 18, optical fibers 20 imbedded in an elastomer 22, and a polymer sheath 23 surrounding the elastomer.

The central elongated strength member, or kingwire, 18, shown in FIG. 2, is a circular cross-section center wire which provides strength to the core 12 during the process of fabricating the core and the cable. A high strength copper clad steel typically is used. In FIG. 2 the circumference of the strength member is shown as a heavy line to represent the copper cladding. A typical diameter of the center wire is 0.8 millimeters. The minimum cross-sectional size of the kingwire 18 is determined by the tensile and bending strengths required for cable fabrication processes. During the cable core fabrication processes, the kingwire is used as the principal strength member. The core is fabricated in two operations. During each operation, the kingwire is used for pulling the growing core through various equipments as materials are added step by step. After fabrication of the core, the cable is fabricated in two additional operations.

After the cable is completely fabricated and while the fiber communication system is being deployed to and operated on the ocean floor, the center wire 18 serves as a center conductor of a coaxial cable arrangement that is used for low frequency signalling of surveillance, maintenance and control information. Because of the coaxial center conductor function, the kingwire is selected to have a conductivity of at least 40 percent of the conductivity of an equal size wire of electrolytic copper.

In an alternative arrangement for use in a terrestrial communication system not using the signalling and operating in ambient temperatures which vary much more widely than ocean temperatures, the central elongated strength member may be fabricated out of high strength glass, in particular as a bundle of high strength glass fibers embedded in a polymer such as epoxy or polyester.

Elastomer 22 is an optical fiber encapsulant, such as an extrusion grade thermoplastic polyester, which is supplied under the name HYTREL by the E. I. du Pont de Nemours and Company and is applied to the kingwire 18 during the first core fabrication operation. Detailed information describing the family of HYTREL polyesters is presented in *Rubber Age*, 104, 3, pages 35-42 (1972); *Proceedings of the International Wire and Cable Symposium*, pages 292-299 (1975); and *Polymer Engineering and Science*, Vol. 14, No. 12, pages 848-852 (December 1974). The thermoplastic elastomer completely encapsulates several separate optical fibers for protecting them inside of the steel strand near the center of the cable. In this arrangement the fibers are located near the neutral bending axis of the cable. When the cable is placed in service, sea bottom pressure is applied essentially symmetrically to the cable. The steel strand arrangement is designed to withstand sea bottom pressure with little deformation. Since the elastomer completely surrounds each fiber within the core, it forms a buffer for isolating each fiber from any residual localized loads resulting from sea bottom pressure. Thereby microbending of the fibers and associated optical losses caused by such microbending are minimized with respect to the effects of sea bottom pressure.

In the first core fabrication operation, the kingwire 18 is unwound from a reel at a controllable tension and speed. It is straightened, cleaned in trichloroethane, and heated. Two layers of elastomer 22 are applied to the hot kingwire. A first layer of the elastomer in a plastic state is extruded directly over the hot kingwire. Some six to twelve glass fibers are laid helically over the first layer of elastomer. The fibers are equally spaced apart over the first layer of elastomer. A second layer of elastomer also is extruded in an amorphous state. This second layer, however, is extruded over the first layer of elastomer and the glass fibers. The second layer of elastomer merges with the first layer between the fibers thereby completely surrounding each of the fibers with the elastomer.

The first core fabrication operation is completed by passing the partially completed core through a water bath for cooling it before winding it onto a take-up reel.

In the second core fabrication operation, the outer surface of the elastomer is covered by the protective polymer sheath 23. One type of polymer used for the sheath is Zytel 153L, NC10 that is a nylon 6/12 supplied by E. I. du Pont de Nemours and Company. This sheath has a melting at point 213° Centigrade. The nylon is selected to have a high flexural modulus, abrasion resistance and compressive strength, as well as a suitable high melting point. It is relatively tough and has a low water absorption as possible. The partially completed core is unwrapped from the reel, and the nylon sheath 23 is extruded over the elastomer 22. The nylon is heated to its plastic state before it is extruded. This sheath completes the core which again passes through a water bath for cooling before the completed core is wound onto a take-up reel.

Since the elastomer completely surrounds the fibers and the nylon surrounds the elastomer, the fibers track the elastomer and the sheath.

Fabrication of this complete core 12 into the cable 10 of FIG. 1 is accomplished in two additional operations. During the first cabling operation, core 12 is payed off the reel and is covered with hot melt adhesive 25, such as one named Eastman 148. The adhesive is heated into a range of 220°-240° Centigrade. The temperature is hot enough for the adhesive to be pumped for flowing over the polymer sheath but not hot enough to damage the core. By means of guides and a wiping die, the adhesive is wiped onto the polymer sheath at a uniform thickness. After the adhesive is applied to the sheath, two layers of stranded steel are laid over the adhesive. The quantity of adhesive 25 is selected to coat the sheath and to almost fill the interstices 27 between the sheath and the wires of the first layer of stranded steel, as shown in FIG. 2. Hardening of the adhesive occurs over a period of several hours. The hardened adhesive forms a tight bond between the polymer sheath 23 and the first layer of the steel strand 13. This bond prevents creep and assures that the fiber core tracks the steel strand during cable laying, cable recovery, and in-service operations. The adhesive 25 is selected so that this bond does not fail during those operations. Creep is very low, nearly imperceptible.

The first layer of the steel strand includes eight wires wrapped directly over and in contact with the outer surface of the core. These eight wires are of similar cross-sectional size laid tightly in friction contact with one another. They are laid so that they form a cylindrically shaped pressure cage in which the wires press against one another without collapsing the cylinder.

The steel stranding in the cable also includes a second, or an outer, layer of sixteen steel wires which are laid over the inner stranded wires. These 16 wires are of alternate large and small diameters. They are laid tightly in friction contact with one another and with the wires of the first, or inner, strand. These wires form an additional cylindrically shaped pressure cage which also holds the inner layer of wires in place. The partially formed cable, including the core, the adhesive and the steel strand is cleaned before being enclosed in a conducting tube.

The cylindrical power conductor of the cable is formed by conductor 14. The nonporous conductive cylindrical tube 14 is formed directly over the outer layer of steel wires. It is formed by a welded seam tube of soft electrolytic copper. This highly conductive tube provides (1) a good direct current path for powering electronic repeaters which are to be spaced along the cable, (2) a moisture barrier for the fibers, and (3) in conjunction with the steel wires, the cylindrical outer conductor for the previously mentioned low frequency signalling system.

During cable fabrication, a high conductivity soft copper tape is cleaned, is slit longitudinally to a uniform width, and is formed into a tubular shape around the steel strand. The tube is sized to fit loosely over the steel strand leaving a gap between the edges of the tape and steel. The edges of the tape then are welded together into the tubular conductor 14. The gap prevents the heat of the copper welding operation from degrading the strength of the steel wires. Immediately the tube is swaged down onto the outer steel strand forcing some copper into the interstices between adjacent wires in the outer steel strand. This swaging of the copper into the interstices helps assure that the steel strand package retains its cylindrical shape, especially during cable handling operations. Swaging the copper down on the steel wires produces an area of contact between each wire and the copper to help retain the cylindrical shape of the strands and to assure that the steel and copper track each other during subsequent cable handling.

Finally the jacket of insulation 16 is extruded over the copper tube 14. The jacket is formed by a low density natural polyethylene. Before extruding the polyethylene, the cable, including the steel stranding and the copper tube, is heated to a temperature high enough for producing a polyethylene to copper bond when the polyethylene is applied. The polyethylene is heated to a plastic state in a temperature range of 210°-230° Centigrade so that the polyethylene flows readily during extrusion. The temperature of the copper tube is elevated to a minimum of 80° Centigrade. A bond, formed between the polyethylene and copper, is sufficiently strong so that they track one another during cable laying and recovery operations and during system service operations. Because of this bond and the tightness between the copper and the steel strand, the outer jacket of polyethylene and the steel strand also track one another. Since the jacket, the steel strand, and the core all track one another, the fibers are strained as much as other components of the cable. Because the fibers are proof tested to 2.0 percent strain, they can withstand the strain of cable laying and recovery operations without breaking. Optical loss in the fibers varies only slightly with changes of tensile strain in the cable. The change in optical loss in the fibers varies much less with strain than the change in loss produced by prior cable design.

Detailed information describing the optical fibers is presented in *Proceedings of the IEEE*, pages 1280-81, Sept. 1974; *Digest of Technical Papers, International Conference on Integrated Optics and Optical Fiber Communications*, page 26, April 1981; *CLEO* 1981, paper W6 6-1, June 1981; and *IEEE Journal of Quantum Electronics*, Vol. QE-18, No. 4, pages 504-510, April 1982.

Figure 3:
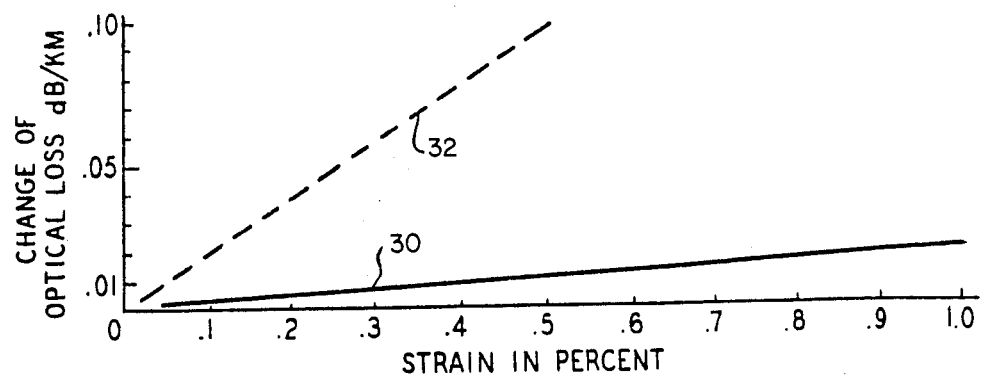
FIG. 3 is a graph showing a comparison between optical loss in fibers of a cable, made in accordance with a prior art design, and in fibers of another cable, made in accordance with the disclosed design, both as a function of the tensile strain in the cable.

FIG. 3 shows the change in optical loss in the fibers with strain in the cable. The solid line 30 represents the change of optical loss characteristic for the fibers in the cable arranged in accordance with the instant invention. Change of optical loss is approximately 0.01 decibels per kilometer at a strain of 0.5 percent. A dashed line 32 represents the change of optical loss characteristic for fibers in a prior art cable arrangement. The line 32 shows the prior design change of optical loss to be approximately 0.10 decibels per kilometer at a strain of 0.5 percent. Reduced change of optical loss with respect to strain results from the new design which enables the cable components to track one another thereby constraining microbending which otherwise would be caused by the strain in the cable.

The foregoing describes an embodiment of the invention. That embodiment together with other embodiments which are obvious to those skilled in the art are considered to be within the scope of the invention.

What is claimed is:

1. An optical fiber cable comprising a core including a plurality of optical fibers, each fiber having an optical loss characteristic;

an elastic material embedding the fibers; and a sheath surrounding the elastic material; stranded wire surrounding the sheath; and an adhesive bonding the stranded wire to the sheath for equalizing the strain of the fibers, the stranded wire, and the cable and thereby constraining the optical loss characteristic of each fiber to vary only slightly in response to changes of strain ranging from 0-1 percent in the cable.

2. An optical fiber cable in accordance with claim 1 wherein the adhesive is a hot melt adhesive that is applied to the sheath at a temperature in a range of 220°-240° Centigrade.

3. An optical fiber cable in accordance with claim 2 wherein the adhesive sets with a bond preventing perceptible creep between the stranded wire and the sheath and enabling the core and the stranded wire to track one another during cable laying and recovery operations.

4. An optical fiber cable in accordance with claim 1 wherein the optical fiber loss is less than 0.02 decibels per kilometer at a strain of 0.5 percent.

5. An optical fiber cable in accordance with claim 3 wherein the sheath is nylon, and
    the adhesive is Eastman 148.

* * * * *